Figure 1:
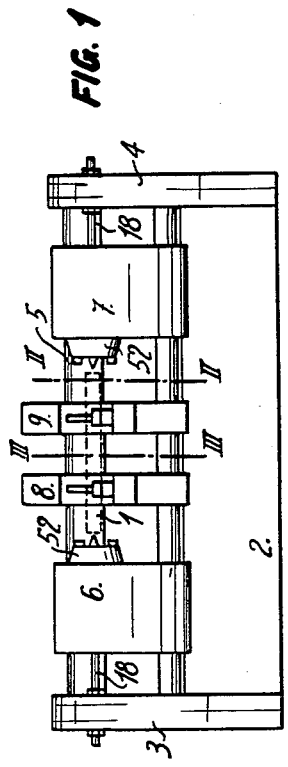

Nov. 12, 1963          R. MOLL          3,110,082
MACHINE-TOOL FOR REDUCING TO A PREDETERMINED
LENGTH AND CENTERING A WORKPIECE
Filed Feb. 15, 1962                    2 Sheets-Sheet 1

INVENTOR
ROBERT MOLL
By Emory L. Groff

Nov. 12, 1963 R. MOLL 3,110,082
MACHINE-TOOL FOR REDUCING TO A PREDETERMINED
LENGTH AND CENTERING A WORKPIECE
Filed Feb. 15, 1962 2 Sheets-Sheet 2
FIG. 5
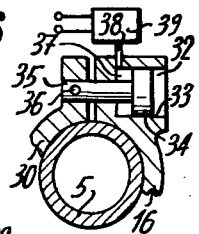
FIG. 6
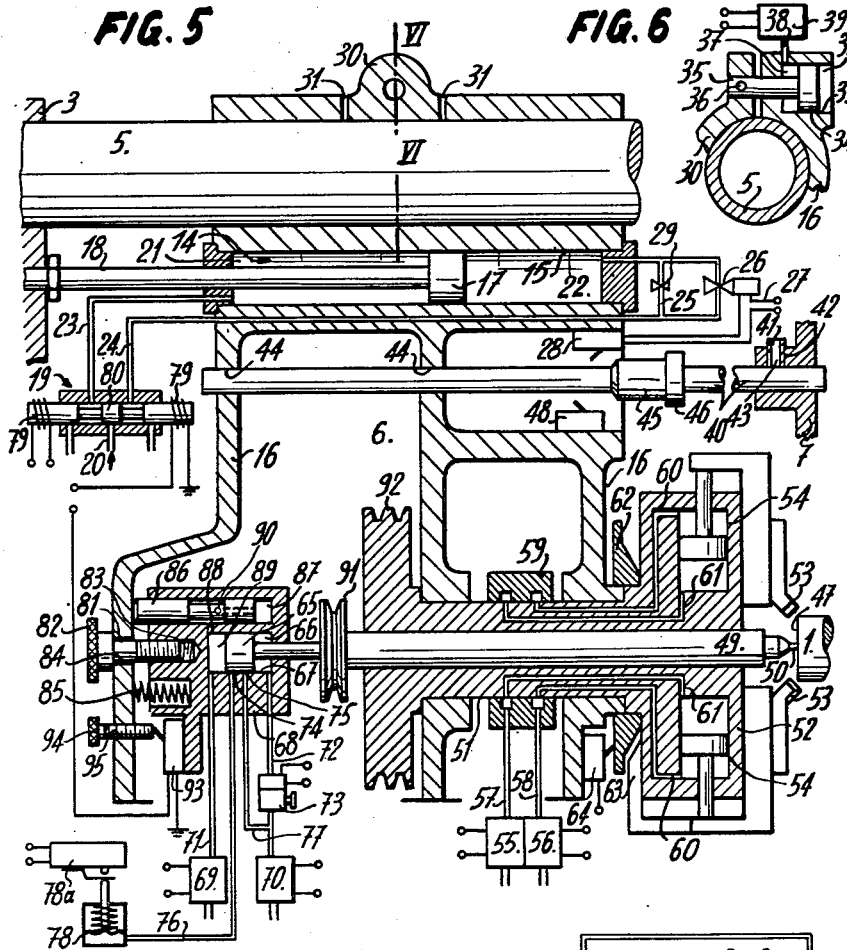
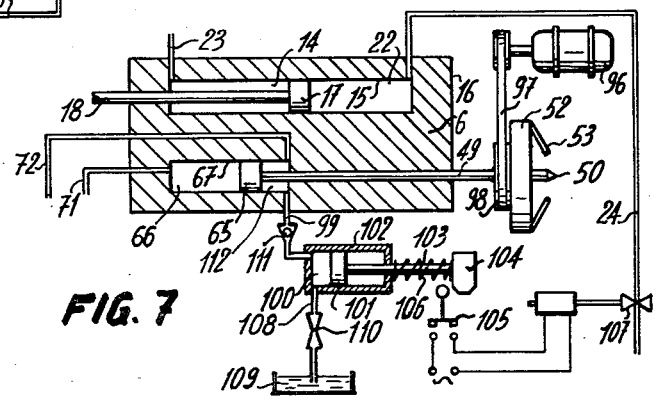
FIG. 7
INVENTOR
ROBERT MOLL
By Emery L. Groff Jr.
Atty

# United States Patent Office 3,110,082
Patented Nov. 12, 1963

3,110,082
MACHINE-TOOL FOR REDUCING TO A PREDETERMINED LENGTH AND CENTERING A WORKPIECE
Robert Moll, 9 Rue du Vidollet, Geneva, Switzerland
Filed Feb. 15, 1962, Ser. No. 173,453
Claims priority, application Switzerland Feb. 17, 1961
8 Claims. (Cl. 29—27)

Mechanical parts to be machined often require, before being mounted on a machine-tool, to be reduced to a predetermined length by lathing and to have centre holes drilled at each end in order that they may subsequently be held between the machine-tool centres.

An object of the present invention is to provide a machine-tool which is capable of such length reduction and drilling of a workpiece before the latter is machined on another machine, for example a lathe.

The machine-tool according to the present invention comprises a bed, two upstanding supporting members projecting from said bed, a cylindrical supporting bar extending horizontally between and supported by said supporting members, a guide rail mounted on said bed and extending parallel to said supporting bar, two oppositely directed angularly adjustable poppets adapted to carry tools and slidably mounted on said supporting bar and guide rail, at least one angularly adjustable vise slidably mounted on said supporting bar and said guide rail between said poppets, and locking means for locking each poppet in a selected position along said supporting bar.

Figure 4:
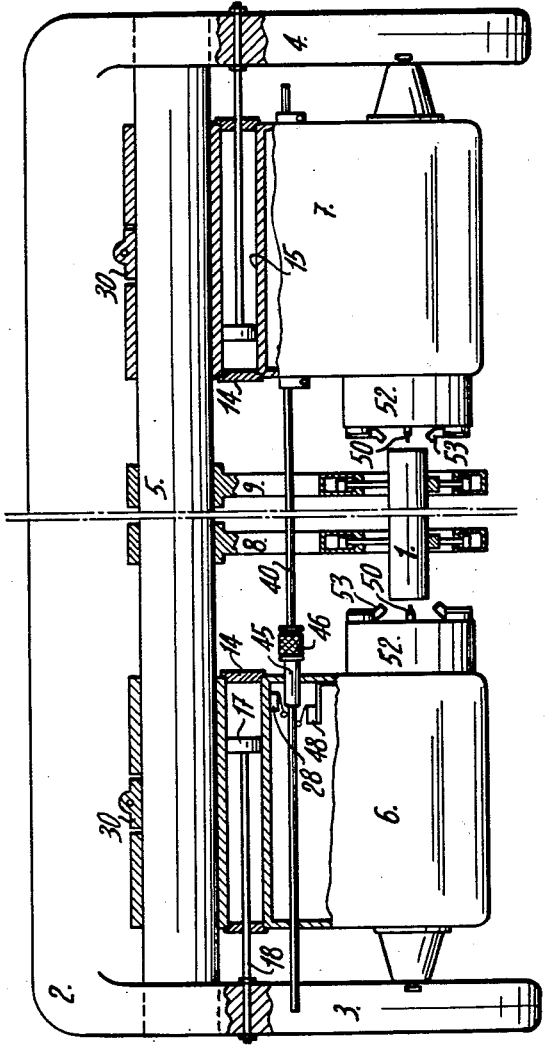
Figure 2:
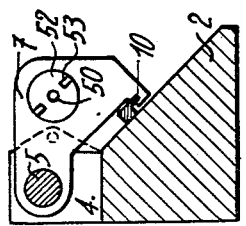
Figure 3:
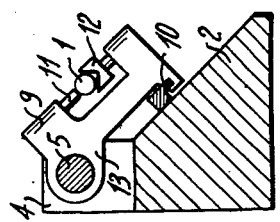

The attached drawings illustrate diagrammatically and by way of example one form of embodiment of a machine-tool according to the invention and a modified detail thereof. In the drawings:

FIGURE 1 is an elevational view of the machine-tool;
FIGURES 2 and 3 are cross-sections taken on the lines II—II and III—III, respectively, of FIGURE 1;
FIGURE 4 is a plan view, on an enlarged scale, of the machine shown in FIGURE 1, with parts shown in section;
FIGURE 5 is a horizontal section through the machine-tool poppet at the right of FIGURES 1 and 4;
FIGURE 6 is a partial cross-section taken on the line VI—VI of FIGURE 5; and
FIGURE 7 illustrates an alternative constructional form of poppet.

The illustrated machine-tool, the function of which is to reduce to a predetermined length, and to drill centre holes in a workpiece 1, comprises a bed 2 provided with two terminal upstanding parts 3 and 4 between which extends a horizontally mounted cylindrical supporting bar 5 which may either be a solid or a hollow tubular bar of great rigidity. On this bar 5 are slidably mounted two poppets 6 and 7 and two vises 8 and 9. The vises 8 and 9 are mounted between the poppets 6 and 7 and their position along bar 5 depends on the length of the workpieces which are to be machined. The poppets 6 and 7 and vises 8 and 9 can be angularly adjusted about bar 5. However, a slide rail 10 mounted on the bed 2 parallel to the supporting bar 5 also serves to guide the poppets 6 and 7 and the vises 8 and 9.

The jaws 11 and 12 of the vises 8 and 9 are actuated by means of hydraulic servo-motors mounted in the supporting frame or structure 13 of each vise. The servo-motors for actuating the jaws 11 and 12 are subjected to the action of a secondary distributor mounted in the supporting frame 13 of each vise, the function of these secondary distributors being to ensure that a workpiece is always positioned on the same reference axis irrespective of the diameter of the workpiece. These secondary distributors and the servo-motors for operating the vise jaws 11 and 12 are described and illustrated in greater detail in the specification of my co-pending application Ser. No. 173,454, filed February 15, 1962.

Poppets 6 and 7 are axially displaceable along the supporting bar 5 under the control of two servo-motors 14 the cylinders 15 of which are formed in the bodies 16 of poppets 6 and 7, respectively, and the pistons 17 of which are connected by rods 18 to the upstanding parts 3 and 4, respectively, of the machine bed 2.

A main distributor 19 enables oil under pressure supplied by a source, such as an oil pump, to the central part 20 of the distributor 19, to be selectively distributed to the chambers 21 and 22 of the cylinder 15 of the servo-motor 14. The space 21 is fed through a conduit 23 and the space 22 is supplied via a conduit 24 and a by-pass 25. Conduit 24 is controlled by a valve 26 operated by a solenoid connected in an electrical circuit 27 controlled by a switch 28 the function of which will be described hereinafter. By-pass 25 is formed with a calibrated passage 29 of reduced cross-section to limit the speed of forward movement of the poppet when the solenoid operated valve 26 is closed.

Poppets 6 and 7 may each be locked in position along the supporting bar 5 by clamping means which, as shown in FIGURES 5 and 6, each comprise a part 30 of the poppet body rendered somewhat flexible in relation to the remainder of the poppet body by the presence of two slits 31. A servo-motor 32 is mounted in a cylinder 33 formed in the poppet body opposite part 30. The piston 34 of this servo-motor is connected by a rod 35 to the part 30 by a pin 36.

It will readily be apparent from FIGURE 6 that if oil under pressure is introduced into the space 37 of servo-motor 32, part 30 of the poppet body will be pulled towards the opposite poppet body part in which is provided the servo-motor 32, thereby to lock the poppet body on the supporting bar 5. The conduit 38 for supplying oil under pressure to the servo-motor 32 is controlled by a solenoid-operated valve 39.

A reference bar 40 extends through poppets 6 and 7 parallel to the supporting bar 5. This reference bar 40 is secured to one of the poppets, in the present instance poppet 7, by means of a screw 41 which extends through a threaded hole 42 in the body of poppet 7 and the point 43 of which engages the right end of reference bar 40 (see FIGURE 5). This reference bar is capable of axial sliding motion in bearings 44 formed in the body 16 of poppet 6 during relative movement of the poppets 6 and 7.

Adjustable abutment means are provided on the reference bar to limit axial movement of the poppets 6 and 7 towards one another to a predetermined distance. These abutment means comprise a sleeve 45 which can be secured at any point along the reference bar 40 by a gripping device, a micrometer screw device 46 enabling accurate positional adjustment of the sleeve 45 on the reference bar 40.

Preferably, the reference bar is formed with graduations to facilitate the required positioning of the sleeve 45. This sleeve 45 is adapted successively to actuate two electric control switches in the course of movement by the poppets 6 and 7 towards one another. The first of these switches is switch 28 controlling the solenoid-operated valve 26. As soon as sleeve 45 actuates this switch 28, the latter causes the valve 26 to close and since the oil can then only be supplied to the chamber 22 of servo-motor 14 via the small calibrated passage 29 of by-pass 25, the speed at which the poppets 6 and 7 are moved towards one another is slowed down. In the course of this movement of poppets 6 and 7 towards one another at reduced speed, feeler means, described hereinafter, come into operation to detect the position of the end face 47 of workpiece 1. As soon as sleeve 45 reaches and actuates the second electric switch 48, the latter brings about the stoppage of poppets 6 and 7, the workpiece 1 having been machined to its required length.

Each poppet carries, in known manner, a rotary spindle 49 on which is fitted a bit 50 for drilling centering holes in the workpiece 1. The spindle 49 is surrounded by a co-axial shaft 51 carrying a plate 52 on which are mounted cutters 53. These cutters 53 can be moved radially on the plate 52 by means of servo-motors 54 actuated by oil under pressure supplied to the servo-motors from solenoid-operated valves 55 and 56, via conduits 57 and 58, via a distribution ring 59 and via passages 60 and 61 drilled in the shaft 51 and the plate 52.

Between the poppet body 16 and the plate 52 is mounted an annulus 62 adapted to be moved axially towards the body 16 by a wedge 63 movable with the cutters 53. When the cutters have completed their cutting operation on the end face 47 of workpiece 1, the wedge 63 engages annulus 62 and moves it towards the body 16. An electric control switch 64 mounted on the adjacent surface of body 16 is actuated during axial displacement of annulus 62. This switch 64 is intended to act on the control circuits of the solenoid-operated valves 55 and 56 to bring about a reversal of the movement of two servo-motors 54 at the end of the lathing operation and hence to move the cutters away from one another. Simultaneously with this reversal in direction of the movement of the servo-motors 54, the switch 64 brings into operation the bit 50 to drill the centering holes in the end face 47 of the workpiece 1 as described hereinafter.

The spindle 49 is capable of axial sliding motion in the poppet, or more exactly, in the hollow shaft 51. This spindle 49 is solid with a piston 65 of a servo-motor 66 for controlling the axial movements of spindle 49. Piston 65 is slidably mounted in a cylinder 67 formed in a casing 68 which is movable relatively to the poppet body 16. This servo-motor 66 is supplied with fluid from two solenoid-operated valves 69 and 70 which control two conduits 71 and 72 opening in the cylinder at opposite ends thereof. Conduit 72 is controlled, moreover, by a regulating valve 73 which enables a reduction of the throughput in conduit 72. This valve 73 is also provided with electro-magnetic control means adapted to close the valve off completely.

The cylinder 67 of servo-motor 66 moreover communicates with two conduits 76 and 77 opening in the cylinder 67 intermediate its ends. Conduit 77 is connected to conduit 72 between the solenoid-operated valves 70 and 73 and enables a rapid outflow of oil from cylinder 67 at the beginning of a forward movement of piston 65, i.e. at the approaching stage of bit 50 towards end face 47. In this connection, conduit 77 does not include any restricting means as is the case with conduit 72 with its solenoid-operated valve 73. This rapid forward movement of piston 65 and of spindle 49 lasts until the orifice 75 of conduit 77 is closed off by the piston 65. The piston 65 can then only continue its forward movement at a reduced speed which is determined by the fluid flow through valve 73.

Conduit 76 is connected to a manometric contact 78 whose switch 78a is connected to and controls the solenoid-operated valves 69 and 70 controlling the servo-motor 66 of the spindle. The manometric contact 78 thus serves to arrest the forward movement of piston 65 when the latter discovers the orifice 74 of conduit 76 to expose it to the pressurized chamber of cylinder 67 of servo-motor 66. Switch 78a, controlled by the manometric contact 78, is moreover electrically connected to the solenoid-operated valve 39 controlling servo-motor 37 for locking the poppets 6 and 7 on the supporting bar 5. This switch also acts on the valves for supplying fluid to the servo-motor 14 for controlling the movements of the poppet. It therefore acts on the windings 79 which control the slide valve member 80 of the main distributor 19 regulating the supply of oil under pressure to the servo-motor 14.

This switch 78a also acts on two servo-motors for actuating the jaws 11 and 12 of the vises 8 and 9 holding the workpiece 1, so that, at the end of the drilling operation, the manometric contact 78 causes, besides stopping the forward movement of bit 50, the unlocking of the poppet, its rearward movement and the release of jaws 11 and 12 of vises 8 and 9.

The extent to which casing 8 is free to move is limited by an adjustable abutment means consisting of a screw 81 which has a knurled head 82 and which is engaged into a threaded bore 83 in casing 68. This screw extends through a hole 84 in the body 16 of the poppet. The head 82 of screw 81 thus constitutes an abutment which limits the distance over which the casing 68 of the body 16 can move towards the workpiece 1. Between the body 16 and casing 68 are provided pusher means which urge the casing in the direction of drilling carried out by bit 50. This pusher means comprises in the illustrated embodiment, a spring 85 interposed between the body 16 and the casing 68 and a plunger 86 slidably mounted in a cylinder 87 formed in casing 68.

This cylinder 87 communicates via a passage 88 with the chamber 89 in cylinder 67 which is pressurized during the drilling operation. A passage 90 drilled in the plunger 86 enables oil under pressure to act on the internal end face of plunger 86 in order to push it towards the body 16 which it engages to return the casing 68 imperatively to the position it occupied before the feeling operation of workpiece 1 by the bit 50, i.e. before it was pushed back towards the left, as viewed in FIGURE 5, by spindle 49.

Casing 68 moreover carries a switch 93 acting on an electrical circuit for controlling the main distributor 19. This switch 93 is actuated at the end of the rearward travel of casing 68 by the end of a screw 94 engaged in a threaded bore 95 in body 16. The actuating position of switch 93 is thus adjustable by means of this screw 94. Upon actuation of switch 93 by screw 94, the switch 93 causes the slide valve member 80 of distributor 19 to occupy a medial position thereby interrupting the supply. Simultaneously, oil under pressure is introduced into the servo-motor 32 under the control of switch 93 to lock the poppet on the supporting bar 5. This switch also initiates the machining cycle of workpiece 1 by feeding oil under pressure in conduit 72 thereby moving cutters 53 forward and moving bit 50 backwards.

The operation of the above-described machine-tool is as follows:

In order to receive a fresh workpiece to be machined, the poppets 6 and 7 of the machine-tool occupy a spaced apart position. The locking means 30 and 32 are released and the cutters 53 and the jaws 11 and 12 of vises 8 and 9 are spaced apart. Moreover, bit 50 is in its forward position since the piston 65 of servo-motor 66 occupies the position it reached at the end of the drilling operation carried out on the previous workpiece. Casing 68 also occupies, under the action of spring 85, its extreme right position in which the head 82 of screw 81 abuts against the body 16. After positioning a fresh workpiece in the jaws 12 of vises 8 and 9, the machine is started.

Once the machine is started, jaws 11 and 12 of vises 8 and 9 are tightened on the workpiece 1. In so doing, the workpiece comes to be positioned on the reference machining axis. The slide valve member 80 of the main distributor is shifted to the left as viewed in FIGURE 5 so that oil under pressure is fed into the chamber 22 of servo-motors 14 to move the poppets 6 and 7 one towards the other. Since valve 26 is open, the first part of this movement takes place rapidly until sleeve 45 of reference bar 40 actuates the switch 28 to close the valve 26 thereby reducing the forward speed of the poppets. Upon engagement of the bit 50 of one of the poppets with end face 47 of the workpiece 1, it causes the spindle 49 to move to the left. Since valve 73 is closed, the piston 65 of servo-motor 66 also moves the casing 68 to the left against the action of spring 85 until screw 94 actuates switch 93. The feeling operation of one poppet is then complete, the second poppet continuing its forward movement until reference bar 40 actuates switch 48. It should be noted that if the workpiece 1 is too long in relation to the setting of the reference bar 40, the feeler means of the second poppet will come into operation to bring the latter to a stop at a given distance from the other end of workpiece 1.

As has already been stated above, the switch 93 causes the slide valve member 80 to occupy a medial position in the distributor 19 thereby arresting the movement of the poppet. If one poppet has already been brought to a stop in this manner, the second poppet will then be arrested by the switch 93 or 48. The locking means 30 and 32 are then brought into operation by feeding oil under pressure into cylinders 37 of servo-motors 32 thereby locking poppets 6 and 7 relative to the supporting bar 5. The machining cycle is then begun by starting up motors for driving the cutter supporting plate 52 and the spindle 49. Cutters 53 are progressively moved forward by the servo-motors 54 and the lathing operation on the end face 47 of workpiece 1 is carried out. Beforehand, valves 70 and 73 have also been opened by switch 93 or 48 causing a flow of oil under pressure in conduit 72 to bring about a rearward movement of the spindle 49 and of the bit 50.

From the above, it will be seen that the setting of screw 94 makes it possible to adjust the extent of lathing carried out by cutters 53. At the end of the lathing operation, the wedge 63 acts on annulus 62 which in turn causes actuation of switch 64 thereby reversing the movement of the cutters 53 which are caused to move radially away from one another. The actuation of switch 64 simultaneously initiates the drilling operation by opening valve 69 thereby feeding oil under pressure via conduit 71 to the chamber 89 of cylinder 67 of servomotor 66. Conduit 72 is thus opened to the atmosphere by valve 70. The oil pressure transmitted from chamber 89 via passages 88 and 90 to the cylinder 87 drives the plunger 86 outwardly thereby ensuring that casing 68 is maintained in the illustrated position as determined by the head 82 of screw 84 abutting against the body 16.

The forward movement of bit 50 towards the workpiece 1 takes place rapidly as long as piston 65 has not closed off the orifice 75 of conduit 77. Once orifice 75 has been closed off, the bit 50 progresses slowly and carries out the actual drilling of the centering hole in the end face 47 of workpiece 1. When the piston 65 uncovers the orifice 74 of conduit 76, the manometric contact is actuated thereby operating its switch 78a as a result of which the following operations take place:

(1) Closing of valve 73, consequently arresting the forward movement of bit 50.

(2) Release of locking means 30 and 32 by opening cylinders 37 of servo-motors 32 to the atmosphere with the aid of valves 39.

(3) Rapid rearward movement of poppets 6 and 7 away from one another brought about by feeding oil under pressure into chamber 21 of servo-motors 14, this movement being initiated by shifting the slide valve member 80 of the main distributor 19 to the right, which shifting operation simultaneously opens chamber 22 of servo-motors 14 to the atmosphere, valve 26 being opened.

(4) Stopping rotary motion of the spindle 49 and of the cutter supporting plate 52.

(5) Release of jaws 11 and 12 of vises 8 and 9.

It should be noted that should the workpiece 1, after a machining operation of its end face 47 by rotary cutters 53, not have been reduced to the desired length, a fresh lathing operation would automatically be initiated.

The lathing cycle is thus repeated until switch 48 is actuated by the sleeve 45 of reference bar 40.

Numerous modifications could be made to the various mechanisms included in the machine described above. FIGURE 7 illustrates diagrammatically an alternative form of feeler means. In this figure are shown the body 16 of the poppet, its servo-motor 14 comprising cylinder 15 in which is slidably mounted piston 17 connected to rod 18, the spindle 49, the cutter supporting plate 52, the servo-motor 66 with its piston 65, the conduits 71 and 72 for actuating servo-motor 66, and the conduits 23 and 24 for actuating servo-motor 14.

FIGURE 7 moreover includes an electric motor 96 which drives by means of a belt 97 and a pulley 98 the cutter carrying plate 52 and the spindle 49 carrying bit 50.

One end of cylinder 67 communicates via conduit 99 with a chamber 100 having a movable wall 101. In the illustrated example, this movable wall 101 is constituted by a piston slidably mounted in a cylinder 102 part of which constitutes the chamber 100. Piston 101 has rigidly secured thereto a rod 103 having at its free end a cam 104 adapted to actuate a switch 105. A spring 106 urges piston 101 back to a predetermined position in which cam 104 is out of engagement with switch 105. Switch 105 forms part of an electrical circuit for controlling a solenoid-operated valve 107 which initiates the feeding of oil under pressure via conduit 24 to chamber 22 of servo-motor 14 to bring about the forward movement of the poppet. As long as switch 105 remains open, valve 107 also remains open and the forward movement of the poppet carries on.

Chamber 100 moreover communicates continuously with an oil reservoir 109 via a conduit 108 formed with calibrated passage 110 having a smaller cross-section than that of conduit 99 connecting cylinder 67 to chamber 100. A non-return valve 111 is mounted in conduit 99.

This alternative feeler means operates as follows:

During forward movement of poppet 6 towards the workpiece and upon engagement of the bit 50 with the workpiece, the rearward movement which is imparted to piston 65 of servo-motor 66 causes a change in volume of chamber 112 of cylinder 67. Since conduit 72 is closed off and conduit 71 is open to the atmosphere, an aspiration occurs which is transmitted via conduit 99 to chamber 100 whose movable wall 101 consequently moves to the left as viewed in FIGURE 7. This movement occurs despite the entry of liquid via conduit 108 and its calibrated passage 110 since the section of the latter is considerably less than that of conduit 99. This movement of the movable wall or piston 101 produces a corresponding displacement of cam 104 which comes to close switch 105 which in turn closes valve 107 immobilizing servo-motor 14.

The function of conduit 108 with its calibrated passage 110 is to enable, when valve 111 is closed, the return of piston 101 to its original position under the action of spring 106, a limited quantity of oil being then sucked from the reservoir 109.

Once the forward movement of poppet 6 has been stopped by closure of valve 107, the machining cycle, i.e. the lathing of the workpiece end face by cutters 53 is carried out followed by the drilling of the centering hole by bit 50, as in the construction described with reference to FIGURES 1 to 6.

I claim:

1. A machine-tool for reducing to a predetermined length and centering a workpiece, said machine-tool comprising a bed, two upstanding supporting members projecting from said bed, a cylindrical supporting bar extending horizontally between and supported by said supporting members, a guide rail mounted on said bed and extending parallel to said supporting bar, two oppositely directed angularly adjustable poppets adapted to carry tools and slidably mounted on said supporting bar and guide rail, each of said poppets comprising a rotary spindle for carrying a drilling bit, a rotary shaft mounted coaxially around said spindle, a plate secured to said shaft, cutter means mounted on said plate for lathing an end face of the workpiece, workpiece feeler means for fixing said poppet in a predetermined position during machining of the workpiece, at least one angularly adjustable vise slidably mounted on said supporting bar and said guide rail between said poppets, and locking means for locking each poppet in a selected position along said supporting bar.

2. A machine-tool for reducing to a predetermined length and centering a workpiece, said machine-tool comprising a bed, two oppositely directed poppets mounted on said bed for axial sliding movement towards one another, a reference bar mounted in and extending between the poppets parallel to the axis of sliding movement of said poppets, said reference bar being fixed to one poppet and slidably mounted in the other poppet, and a pair of electrical switches mounted in said other poppet for successive actuation by said abutment means during movement of said poppets towards one another, the switch that is first actuated serving to reduce the speed at which the poppets move towards one another and the switch that is subsequently actuated serving to bring said poppets to a stop.

3. A machine-tool as claimed in claim 1, wherein said rotary spindle is mounted in said poppet for axial movement therein, which spindle is rigidly connected to a servo-motor piston slidably mounted in a cylinder formed in a casing which is mounted for movement in the poppet body, the main supply conduits of the spindle servo-motor being controlled by valves enabling the piston of thte servo-motor to be blocked in its cylinder to render the casing solid with the spindle during its rearward movement in the course of a feeling operation, said poppet further comprising adjustable abutment means for limiting movement of said casing, pusher means interposed between the poppet body and said casing for urging the casing in the drilling direction of said bit, an electrical switch for controlling a distributor for supplying fluid to the poppet driving servo-motor, said switch being so disposed in said poppet to be actuated in the course of the rearward movement to which said casing is subjected after said drilling bit has felt the workpiece to bring said poppet to a stop and means for adjusting actuation of said switch thereby to adjust the length of the rearward displacement of the drilling bit by the workpiece and hence the depth of cut on the end face of the workpiece by the cutters.

4. A machine-tool as claimed in claim 3, wherein the cylinder of the spindle servo-motor communicates at two points intermediate its ends with two conduits of which one is intended to enable a rapid forward movement of the spindle until it becomes closed off by the advancing piston of said spindle servo-motor, the other conduit being connected to a manometric switch operatively connected with the valves controlling the spindle servo-motor to bring the forward movement of said servo-motor to a stop when its piston discovers said other conduit and causes the latter to be subjected to the pressurized chamber of the servo-motor cylinder.

5. A machine-tool as claimed in claim 4, wherein said casing comprises a second cylinder in which a plunger is slidably mounted, said second cylinder communicating with the side of cylinder of the spindle servo-motor that is pressurized to move the spindle forward, said plunger being arranged to bear against the poppet body at the beginning of a drilling operation to return said casing imperatively back to the position it occupied before the feeling operation and before being driven back by the spindle.

6. A machine-tool as claimed in claim 5, wherein the cutters carried by the plate of said shaft are actuated by servo-motors the forward movement of which is reversed at the end of a cutting operation through the intermediary of an electrical switch electrically connected to the valves controlling the servo-motors actuating the cutters and to the valves controlling the spindle servo-motor so as simultaneously to begin the drilling operation by feeding oil under pressure into the servo-motor of the spindle to bring about the forward movement of the latter.

7. A machine-tool as claimed in claim 6, wherein the manometric switch is moreover electrically connected with the supply valve of a servo-motor for locking the poppet on the supporting valve, with the supply valves of the servo-motor controlling the movements of the poppet, and with the valves for controlling the servo-motors for actuating the jaws of the vise for holding the workpiece, so that at the end of a drilling operation, the manometric contact causes, in addition to bringing the forward movement of the drilling bit to a stop, the unlocking of the poppet, its rearward displacement and the release of the vise jaws.

8. Machine-tool as claimed in claim 1, wherein the drilling spindle is mounted for axial movement in the poppet, which spindle is solid with a servo-motor piston slidably mounted in a cylinder carried by the poppet, one of the sides of the cylinder communicating with a chamber having a movable wall normally held in a predetermined position by a return spring, said movable wall controlling the operation of a switch for controlling the forward movement of the poppet, and said chamber being in continuous communication with a reserve of fluid via a calibrated orifice having a smaller cross-section than that of the conduit connecting said cylinder to said chamber so that upon engagement of the workpiece by the drilling bit, the movement of the servo-motor piston causes a change in volume of the cylinder part communicating with said chamber to move said movable wall and to bring about the forward movement of the poppet to a stop.

References Cited in the file of this patent
UNITED STATES PATENTS

| | | |
|---|---|---|
| 1,571,331 | Hagman | Feb. 2, 1926 |
| 2,002,186 | Lovely | May 21, 1935 |
| 2,966,721 | Bordington | Jan. 3, 1961 |